United States Patent [19]

Dombrowski

[11] Patent Number: 4,864,298

[45] Date of Patent: Sep. 5, 1989

[54] DRIVER ALERTING DEVICE

[76] Inventor: Anthony E. Dombrowski, 9903 Broadmoor Dr., Omaha, Nebr. 68114

[21] Appl. No.: 178,776

[22] Filed: Apr. 1, 1988

Related U.S. Application Data

[63] Continuation of Ser. No. 895,536, Aug. 13, 1986, which is a continuation of Ser. No. 667,082, Nov. 1, 1984, which is a continuation-in-part of Ser. No. 579,160, Feb. 10, 1984.

[51] Int. Cl.$^4$ ............................................. G08G 1/00
[52] U.S. Cl. ..................................... 340/904; 340/903; 340/901; 340/435; 367/909; 180/169
[58] Field of Search ............. 340/904, 903, 901, 52 H, 340/53; 367/909; 180/169

[56] References Cited

U.S. PATENT DOCUMENTS

| 2,974,304 | 3/1961 | Nordlund | 367/112 |
|---|---|---|---|
| 3,226,673 | 12/1965 | Cudworth | 367/112 |
| 3,732,555 | 5/1973 | Strenglein | 340/904 |
| 3,760,415 | 9/1973 | Holmstrom et al. | |
| 3,781,879 | 12/1973 | Staras et al. | |
| 3,789,950 | 2/1974 | Strenglein | 340/904 |
| 3,921,749 | 11/1975 | Kawada | 340/904 |
| 3,984,836 | 10/1976 | Oishi | 343/13 R |
| 4,001,823 | 1/1977 | matsui | 343/7 VM |
| 4,015,232 | 3/1977 | Sindle | 340/904 |
| 4,260,980 | 4/1981 | Bates | |
| 4,278,962 | 7/1981 | Lin | 340/904 |
| 4,300,116 | 11/1981 | Stahovec | |
| 4,356,489 | 10/1982 | Hirota | 343/7 VM |
| 4,358,759 | 11/1982 | Stewart et al. | |
| 4,404,541 | 9/1983 | Kodera et al. | 340/904 |
| 4,528,563 | 7/1985 | Takeuchi | 340/903 |
| 4,543,577 | 9/1985 | Tachibana et al. | |

OTHER PUBLICATIONS

Bureau of Mines Publication published in 1986 titled "Improved Back-Up Alarm Technology for Mobile Mining Equipment".

Primary Examiner—Donnie L. Crosland

[57] ABSTRACT

A driver alerting device includes a transceiver adapted for mounting at the rearward end of a vehicle for directing its wave output rearwardly of the vehicle. Return wave signals for many objects within the transceiver range are picked up and supplied to the transceiver by an antenna. Any resultant doppler shift signal is amplified for driving an audio alarm adapted for placement within the passenger compartment of the vehicle. The doppler shift signal also activates a solenoid which applies the air brakes of the vehicle. The circuit is adapted for operative electrical connection to the vehicle transmission or the like for activation only when the vehicle transmission is engaged in reverse gear.

9 Claims, 1 Drawing Sheet

DRIVER ALERTING DEVICE

CROSS-REFERENCE TO APPLICATION

This application is a continuation of application Ser. No. 895,536 filed Aug. 13, 1986, now abandoned, which is a continuation of application Ser. No. 667,082, filed Nov. 01, 1984, now abandoned, which is a continuation-in-part of Ser. No. 579,160 filed Feb. 10, 1984 now abandoned.

BACKGROUND OF THE INVENTION

The present invention is directed generally to a device for alerting the driver of a rearwardly moving vehicle to the presence of any object in close range behind the vehicle. More particularly, the present invention is directed to a micro-wave radar device using the doppler shift principle to detect the presence of a moving target within the transceiver range. The present invention is also directed a means for applying the air brakes of the vehicle when the presence of an object is detected behind the vehicle.

Drivers of motor vehicles have always had a certain degree of difficulty with backing up their vehicles. Whereas this is due partly to the different steering response of a rearwardly moving vehicle, most backing-up accidents are due to the driver's limited visibility. Many trucks have a considerable blind spot directly rearwardly of the vehicle which is not visible through side mounted mirrors. But even in smaller trucks and passenger cars with rear windows, there may be blind spots at the rearward corners of the vehicle and below the driver's line of sight.

Devices have previously been known for detecting the presence of objects behind a vehicle but such devices have not achieved widespread usage. Devices which provide an audible alarm directed rearwardly of the vehicle are ineffective if a child, for example, in the path of the vehicle does not react to the alarm and if the vehicle driver does not hear the alarm. Certainly an external alarm will not remove stationary objects from the path of the vehicle.

Accordingly, an object of the invention is to provide an improved device for alerting the driver of a rearwardly moving vehicle to the presence of a person or object within a short range distance behind the vehicle.

Another object is to provide such a device with a remote audible alarm suitable for placement within the passenger compartment of a vehicle.

Another object is to provide such a device which employs micro-wave radar technology.

Another object is to provide a driver alerting device which may be easily electrically and mechanically connected to a vehicle.

Yet another object is to provide a device which applies the air brakes of a vehicle when the presence of a person or object within a short range distance behind the vehicle is detected.

Finally, an object is to provide a driver alerting device which is economical to manufacture, simple and rugged in construction and efficient in operation.

SUMMARY OF THE INVENTION

The driver alerting device of the present invention includes a transceiver adapted for mounting at the rearward end of a vehicle for directing its wave output rearwardly of the vehicle. Return wave signals from any object within the short transceiver range behind the vehicle are supplied to the transceiver through an antenna connection. Any resultant doppler shift signal is amplified for driving the audio alarm. The circuit of the device is adapted for electrical connection to the back-up light circuit of a vehicle for activation only when the vehicle transmission is engaged in reverse gear.

The driver alerting device thus immediately sounds an alarm when any moving or stationary object is detected within the short transceiver range behind a rearwardly moving vehicle on which it is installed. Even when the vehicle is stationary, but with the back-up lights activated, the device will signal the presence of any moving object within the transceiver range. Because the device operates by micro-wave radar, it is unaffected by noise, light, or weather conditions such as snow, rain, heat and cold. The apparatus also includes means for applying the air brakes of the vehicle when an object is detected.

DESCRIPTION OF THE PREFERRED EMBODIMENT

Figure 1:
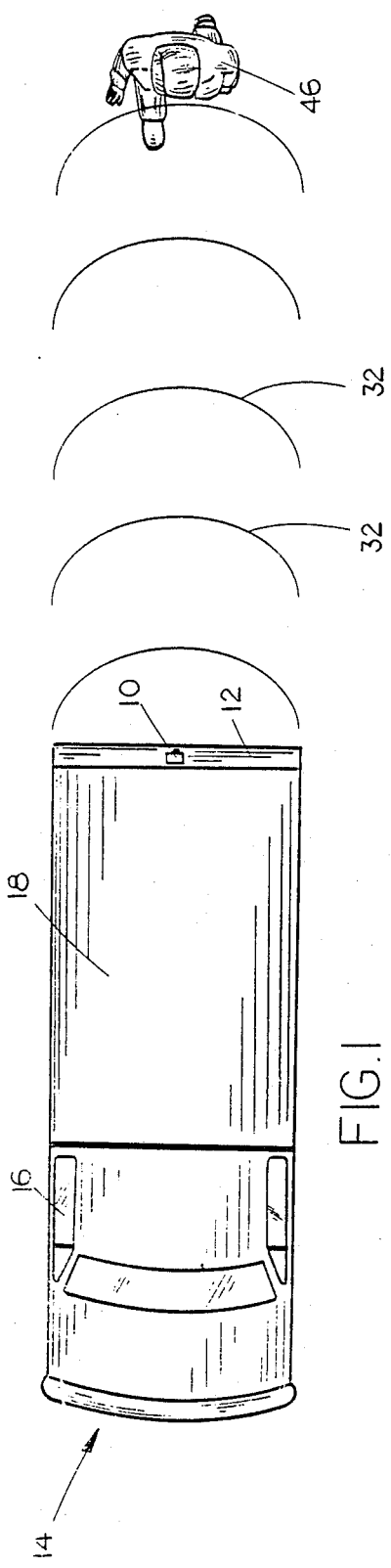
FIG. 1 is a diagrammatic top plan view of the driver alerting device installed on a vehicle.

The driver alerting device of the present invention is indicated generally at 10 in FIG. 1 installed on the rear bumper 12 of a truck 14 having a passenger compartment 16 situated forwardly of box 18. Device 10 operates by micro-wave radar using the doppler shift principle to detect the presence of a moving target within the transceiver range.

Figure 2:
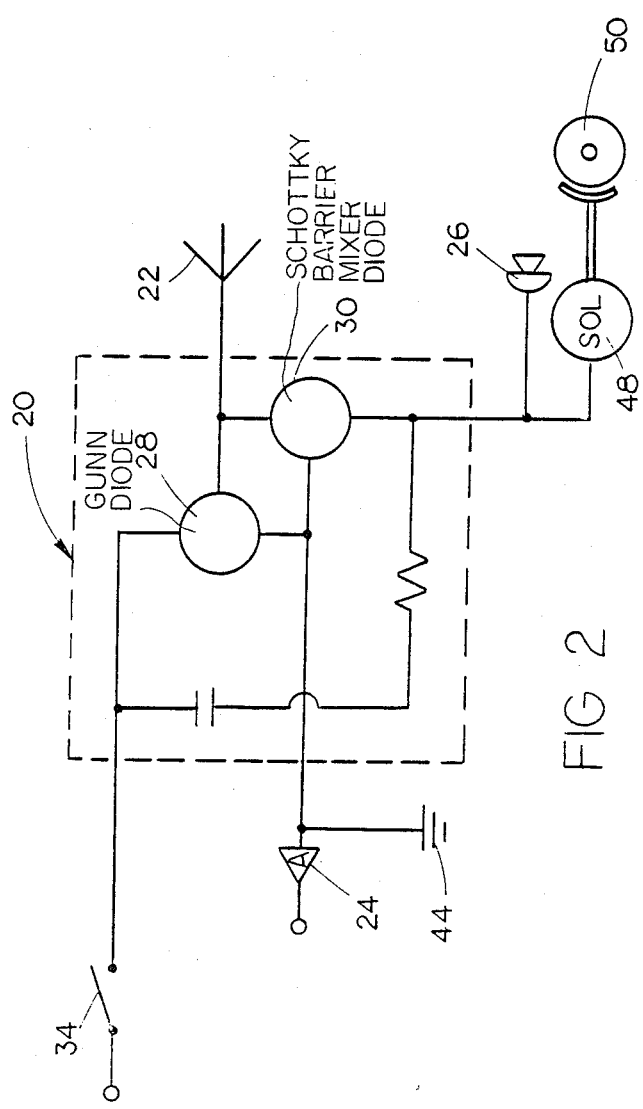
FIG. 2 is an electrical schematic circuit diagram of the driver alerting device.

The operating elements of the device 10 are wholly electronic and are shown in FIG. 2 as including a transceiver 20, an antenna 22, an intermediate frequency amplifier 24 and an audio alarm 26.

The transceiver 20 includes a gunn diode 28 mounted in a wave guide cavity which acts as the transmitter and local oscillator, together with a schottky barrier mixer diode 30 for the receiver. Electromagnetic radiation transmitted from the gunn diode 28 is reflected back at the antenna by any object within the transceiver range. If that object is moving relative to the vehicle, the frequency shift of the wave reflected by the moving object is measured electronically and triggers activation of the alarm 26.

In the preferred embodiment, output frequency of the transceiver 20 is factory preset at 10.525 GIGA HERTZ. Power output is 5 milliwatts minimum. Operating voltage is 8 volts D.C. The resultant doppler frequency obtained is 31.39 HERTZ for each mile per hour of radio velocity. The transceiver is unaffected by the presence of magnetic fields, noise, light and varying weather conditions.

Antenna 22 may be provided as either a high gain antenna or low gain antenna. The high gain antenna is preferred for application with ¼ ton, ½ ton and 1 ton vehicles measuring on 1 ton and larger vehicles measuring 80 inches and greater in width. The range of the antennas is adjustable and may be user set to accommodate virtually any vehicle. This adjustment is incorporated in the intermediate frequency amplifier 24 and is accessible from the outside of the unit. Antenna 22 is preferably constructed of machined aluminum and is also preferably flange-mounted directly to the transceiver 20, thus eliminating the effects of noise and spurious response. Lines 32 in FIG. 1 illustrate an example of a typically adjusted wave pattern.

The intermediate frequency amplifier 24 is a solid state, multi-stage operational amplifier designed to amplify and shape the resultant doppler shift signal. The circuitry is card mounted and has built-in range and sensitivity controls. The amplifier is designed to interface with the existing reverse switch 34 (FIG. 2) in order to activate the circuit only during reverse operation of the vehicle. Reverse switch 34 is typically associated with the vehicle transmission and is incorporated into the back-up light circuit of the vehicle for illuminating the back-up lights whenever the vehicle transmission is engaged in reverse gear.

The audio alarm 26 is mounted interiorly of the passenger compartment 16 so as to be readily audible to the driver of the vehicle. Amplifier 24 drives both the audio alarm 26 and a light emitting diode mounted on the unit. The purpose of the light emitting diode is to aid in the adjustment of the unit in the event that the alarm is not audible to the one adjusting the unit at the rearward end of the vehicle.

Figure 3:
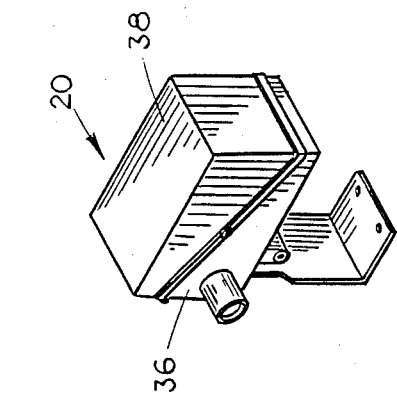
FIG. 3 is a perspective view of the transceiver housing of the device.

The transceiver 20 is shown in FIG. 3 as including a housing 36 which is diagonally sectioned to provide a pivotal top cover 38. The wave output from the transceiver 20 is transmitted outwardly through a rearwardly protruding channel section 40 on the rear wall of housing 36. A mounting flange 42 extends downwardly from the housing for ready attachment to a vehicle bumper or the like.

The circuitry is card mounted and all components are treated with a conformal coating to prevent the effects of moisture and salt. Electrical hook-up to the vehicle is achieved via a splash-proof four circuit connector mounted on the side of the unit. One of the four leads is connected to the vehicle ignition switch, one to the back-up lights or reverse switch 34 on the transmission, one to ground 44 and one to the alarm 26.

The audio alarm is preferably a solid state piezoelectric alarm capable of developing 80 decibels at 12 volts D.C.

In operation, the transceiver 20 is activated to transmit electromagnetic radiation whenever the vehicle ignition is on and the transmission is engaged in reverse gear. This closes the vehicle reverse switch 34 for illuminating the vehicle backup lights. A reducer may be provided between the transceiver 20 and reverse switch 34 to adjust the operating voltage to 8 volts D.C. The transceiver range spans the width of the vehicle 14 and extends rearwardly approximately 6 to 12 feet. The maximum range would be approximately 20 feet.

As the vehicle is driven rearwardly, reflected signals from any object within the transceiver range, such as loading dock 46, are picked up by antenna 22 and supplied to the mixer diode 30 where the frequency shift is measured electronically. Amplifier 24 is designed to amplify and shape the resultant doppler shift signal and to activate the alarm 26. Note that when the vehicle is backing up, both stationary and moving objects within the transceiver range will be detected since there will be relative movement between the transceiver and these objects. Even when the vehicle is stationary, a moving object, such as a running child, will be detected by the transceiver and result in activation of the alarm. A stationary object will not be detected when the vehicle is stationary since there is no relative movement to cause a doppler shift signal to be generated. Thus the alarm will stop once the moving object leaves the transceiver range. Likewise, when the buzzer is activated by a stationary object, it will stop once the vehicle is stopped.

In addition to the audio alarm 26 being activated when an object behind the vehicle is detected, a solenoid 48 is also activated. Solenoid 48 is operatively connected to the air brakes 50 of the vehicle so that the brakes of the vehicle are also applied to halt the rearward movement of the vehicle. In such a case, the audio alarm 26 may not be necessary since the vehicle operator will be alerted to the object behind the vehicle since the brakes of the vehicle will be applied to stop the rearward movement of the vehicle.

Thus there has been shown and described a driver alerting device for a vehicle which accomplishes at least all of the stated objects.

I claim:

1. A device for halting the movement of a vehicle, said vehicle having brakes,
   a transceiver comprising a micro-wave radar device using the doppler shift principle to detect the presence of a target within the transceiver range,
   means for supporting said transceiver at the rearward end of the vehicle for directing the wave output thereof rearwardly of the vehicle,
   means for supplying to said transceiver return wave signals from any target within the transceiver range, an intermediate frequency applifier operatively connected to said transceiver, said amplifier being operative to amplify and shape said return wave signals,
   means for electrically connecting said brakes to said transceiver for activation of said brakes in response to detection by said transceiver of return wave signals from any target within the transceiver range, and
   means for electrically connecting said transceiver to means associated with the reverse mechanism of the vehicle for activation of said transceiver in response to said vehicle being placed in reverse gear, said device being substantially unaffected, in operation, by varying weather conditions.

2. The device of claim 1 wherein a remote audible alarm is placed for placement within the passenger compartment of the vehicle.

3. The device of claim 1 wherein said transceiver includes a wave guide cavity and a gunn diode mounted in said wave guide cavity for transmitting wave output therefrom.

4. The device of claim 3 wherein said transceiver further includes a schottky barrier mixer diode which is operative as the receiver thereof.

5. The device of claim 1 wherein said means for supplying return wave signals to said transceiver comprises a high gain antenna.

6. The device of claim 1 wherein said means for supplying return wave signals to said transceiver comprises a low gain antenna.

7. The device of claim 1 wherein said means for supplying return wave signals to said transceiver comprises an antenna mounted directly to the transceiver.

8. The device of claim 1 wherein said intermediate frequency amplifier is a solid state multi-stage operational amplifier.

9. The device of claim 1 wherein said remote audible alarm comprises a solid state piezoelectric alarm.

* * * * *

UNITED STATES PATENT AND TRADEMARK OFFICE
CERTIFICATE OF CORRECTION

PATENT NO. : 4,864,298

DATED : September 5, 1989

INVENTOR(S) : ANTHONY E. DOMBROWSKI

It is certified that error appears in the above-identified patent and that said Letters Patent is hereby corrected as shown below:

On the title page, item [73], please insert the following

Assignment data:

--Assignees: Steven F. Sommers, Omaha; Bruce E. Schreiner, Grand Island; Land Paving Company, Omaha; Omni Holding Company, Omaha; Jerry Ronk, Omaha; Robert Wichser, Omaha, all of Nebr.--.

Signed and Sealed this

Twenty-fifth Day of October, 1994

Attest:

BRUCE LEHMAN

Attesting Officer

Commissioner of Patents and Trademarks